(12) United States Patent
Ozaki et al.

(10) Patent No.: US 10,655,010 B2
(45) Date of Patent: May 19, 2020

(54) AROMATIC POLYCARBONATE OLIGOMER SOLID

(71) Applicant: Honshu Chemical Industry Co., Ltd., Tokyo (JP)

(72) Inventors: Mitsutaka Ozaki, Wakayama (JP); Miwa Hashimoto, Wakayama (JP); Takahiro Onishi, Wakayama (JP); Takeru Suto, Wakayama (JP)

(73) Assignee: Honshu Chemical Industry Co., Ltd., Tokyo (JP)

( * ) Notice: Subject to any disclaimer, the term of this patent is extended or adjusted under 35 U.S.C. 154(b) by 50 days.

(21) Appl. No.: 16/060,165

(22) PCT Filed: Nov. 28, 2016

(86) PCT No.: PCT/JP2016/085185
§ 371 (c)(1),
(2) Date: Jun. 7, 2018

(87) PCT Pub. No.: WO2017/098947
PCT Pub. Date: Jun. 15, 2017

(65) Prior Publication Data
US 2018/0371236 A1  Dec. 27, 2018

(30) Foreign Application Priority Data
Dec. 8, 2015 (JP) .................. 2015-239088

(51) Int. Cl.
*C08G 64/06* (2006.01)
*C08L 69/00* (2006.01)

(52) U.S. Cl.
CPC .............. *C08L 69/00* (2013.01); *C08G 64/06* (2013.01)

(58) Field of Classification Search
USPC ........................................ 528/196, 198, 219
See application file for complete search history.

(56) References Cited

FOREIGN PATENT DOCUMENTS

| JP | H03-190924 | 8/1991 |
|---|---|---|
| JP | H09-291143 | 11/1997 |
| JP | H10-114820 | 5/1998 |
| JP | 2001-163967 | 6/2001 |
| JP | 2003-192779 | 7/2003 |
| JP | 2007-119691 | 5/2007 |
| JP | 2009-180760 | 8/2009 |
| JP | 2009-186743 | 8/2009 |

OTHER PUBLICATIONS

Notification concerning Transmittal of International Preliminary Report on Patentability dated Jun. 21, 2018 in International Application No. PCT/JP2016/085185.
Notification of Transmittal of Translation of the International Preliminary Report on Patentability dated Jun. 21, 2018 in International Application No. PCT/JP2016/085185.
International Search Report, dated Feb. 7, 2017, in International Patent Application No. PCT/JP2016/085185.

*Primary Examiner* — Terressa Boykin
(74) *Attorney, Agent, or Firm* — Knobbe Martens Olson & Bear LLP

(57) ABSTRACT

The purpose of the present invention is to provide an aromatic polycarbonate oligomer solid which has a markedly reduced low molecular weight component, has no or markedly reduced chlorine-containing compounds, has a high loose bulk density and is easy to handle. This purpose is met by an aromatic polycarbonate oligomer solid which includes a repeating unit represented by general formula (1), has a weight average molecular weight of 500-10000, has a low molecular weight component of less than or equal to 5.0 area % in high performance liquid chromatography measurement, and has a loose bulk density of greater than or equal to 0.30 g/cm$^3$ (1)

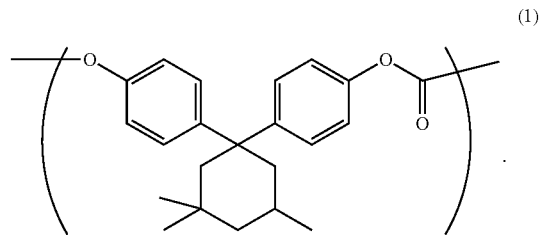

2 Claims, No Drawings

AROMATIC POLYCARBONATE OLIGOMER SOLID

TECHNICAL FIELD

The present invention relates to an aromatic polycarbonate oligomer solid, and particularly relates to an aromatic polycarbonate oligomer solid containing 1,1-bis(4-hydroxyphenyl)-3,3,5-trimethyl cyclohexane and a carbonate precursor as raw materials.

PRIOR ART

The polycarbonate oligomer is widely used, for example, as an intermediate raw material in the production of a high molecular weight polycarbonate by an interfacial polymerization method, as a raw material in the production of a high molecular weight polycarbonate by a melt polymerization method or a solid phase polymerization method, or as a polymer modifier such as a surface modifier, a flame retardant, an ultraviolet absorber, a flowability modifier, a plasticizer, or a compatibilizer for resin alloy. In recent years, the required performance of polycarbonate oligomers has become increasingly diverse and severe, and further improvements have been demanded for polycarbonate oligomers other than bisphenol A type polycarbonate oligomers. Among them, aromatic polycarbonate oligomers containing 1,1-bis(4-hydroxyphenyl)-3,3,5-trimethyl cyclohexane and a carbonate precursor as raw materials require further improvement in performance.

On the other hand, in a method of producing a polycarbonate oligomer, an interfacial polymerization method in which an aromatic dihydroxy compound and phosgene are used as raw materials and reacted in a methylene chloride solvent to produce a polycarbonate oligomer as an intermediate raw material of a high molecular weight polycarbonate is mainly used, and usually there is employed a method of blowing phosgene into an alkaline aqueous solution of bisphenols to produce a polycarbonate oligomer having a reactive chloroformate group, mixing the polycarbonate oligomer and the alkaline aqueous solution of bisphenols, and advancing a polycondensation reaction in the presence of a polymerization catalyst such as a tertiary amine. However, the interfacial polymerization method has problems such as that toxic phosgene must be used, that equipment is corroded by chlorine-containing compounds such as the by-produced hydrogen chloride and sodium chloride, and methylene chloride used in large amount as a solvent, and that it is difficult to separate impurities such as sodium chloride which adversely affect polymer physical properties and residual methylene chloride. Thus, a method of producing a polycarbonate oligomer by a melt transesterification method using an aromatic dihydroxy compound and a carbonic acid diester as raw materials has also been put into practical use. However, although the melt transesterification method has solved the above problems in the interfacial polymerization method, there is a problem that the produced oligomer contains a large amount of residual monomers and low molecular weight components.

On the other hand, among polycarbonate oligomers obtained by the interfacial polymerization method, as a polycarbonate oligomer containing, as a monomer component, a bisphenol compound other than bisphenol A (hereinafter sometimes referred to as special bisphenol), polycarbonate oligomers respectively containing, as a monomer component, 2,2-bis(4-hydroxy-3-methylphenyl)propane (Patent Literature 1), 1,1-bis(4-hydroxyphenyl)cyclohexanes (Patent Literature 2), and 1,1-bis(4-hydroxyphenyl) cyclododecane (Patent Literature 3) are known.

However, since these special bisphenol polycarbonate oligomers are produced by the interfacial polymerization method, when they are used as prepolymers or additives, as described above, corrosion of equipment due to residual chlorine-containing compounds and deterioration of polymer physical properties are concerned.

As aromatic polycarbonate oligomers obtained by the melt transesterification method, polycarbonate oligomer of bisphenol A and polycarbonate oligomers of special bisphenols such as 1,1-bis(4-hydroxyphenyl)cyclohexane and 1,1-bis(4-hydroxyphenyl)-3,3,5-trimethyl cyclohexane are known (Patent Literatures 4, 5, and 6).

However, these polycarbonate oligomers are either taken out as they are after the reaction or only subjected to heat treatment, and since they have not undergone a purification process, low molecular weight components formed during the reaction remain. Accordingly, when the polycarbonate oligomers are directly used for polycarbonate raw materials for melt polymerization or solid phase polymerization, there is a high possibility that troubles such as line clogging occur due to volatilization of low molecular weight components in equipment. Further, there is a concern that impact strength may be lowered and adhesion to a mold may occur when a high molecular weight polycarbonate is used. Furthermore, if a large amount of low molecular weight components remain in the polycarbonate oligomer, storage stability is poor, and deterioration of qualities such as coloration is concerned.

In the prior art, a method of isolating an aromatic polycarbonate oligomer starting from 1,1-bis(4-hydroxyphenyl)-3,3,5-trimethyl cyclohexane and a carbonate precursor as a solid from a final reaction product is not known; however, as a method of removing an aromatic polycarbonate oligomer starting from 1,1-bis(4-hydroxyphenyl)cyclohexane and a carbonate precursor as a solid from a final reaction product, there is known a method in which a tetrahydrofuran solution of a polycarbonate oligomer of 1,1-bis(4-hydroxyphenyl) cyclohexane obtained by an interfacial polymerization method is added dropwise to methanol to precipitate, and a solution dissolved in dichloromethane is added dropwise to methanol to precipitate (Patent Literature 1).

However, the polycarbonate oligomer obtained by the above method is produced by the interfacial polymerization method, and in addition, precipitation is carried out using a dichloromethane solution; therefore, a chlorine-containing compound such as dichloromethane remaining in the polycarbonate oligomer cannot be completely removed, and as described above, corrosion of equipment and deterioration of polymer physical properties are concerned. In addition, the polycarbonate oligomer of 1,1-bis(4-hydroxyphenyl) cyclohexane obtained from a solvent system using the above tetrahydrofuran and dichloromethane solution has low bulk density and thus is difficult to handle, and when the polycarbonate oligomer is used as a reaction raw material, there is also a problem that not only more energy is required for charging the polycarbonate oligomer into a reaction vessel, but also the reaction vessel itself must be made larger.

Patent Literature 1: Japanese Patent Laid-open No. 2001-163967

Patent Literature 2: Japanese Patent Laid-open No. 2007-119691

Patent Literature 3: Japanese Patent Laid-open No. 2009-186743

Patent Literature 4: Japanese Patent Laid-open No. 2003-192779

Patent Literature 5: Japanese Patent Laid-open No. 2009-180760

Patent Literature 6: Japanese Patent Laid-open No. 3-190924

SUMMARY OF THE INVENTION

Problems to be Solved by the Invention

The present invention has been made against the background of the above circumstances in the polycarbonate oligomer, and it is an object of the present invention to provide a solid of an aromatic polycarbonate oligomer containing 1,1-bis(4-hydroxyphenyl)-3,3,5-trimethyl cyclohexane and a carbonate precursor as raw materials. The solid has a suitable molecular weight for improving reactivity without increasing viscosity. In addition, in the solid, low molecular weight components are remarkably reduced, and the chlorine-containing compound is not present or is remarkably reduced. Further, loose bulk density in the solid is high, and the solid is, for example, an easy-to-handle powder solid.

Means for Solving the Problems

As a result of intensive studies to solve the above-mentioned problems, the present inventors have found that, in an aromatic polycarbonate oligomer containing 1,1-bis(4-hydroxyphenyl)-3,3,5-trimethyl cyclohexane and a carbonate precursor as raw materials, oligomers of a final reaction product are precipitated or subjected to slurry treatment using a specific solubilizing solvent or a specific precipitating solvent and are dried, so that it is possible to obtain a solid in which low molecular weight components are remarkably reduced, the chlorine-containing compound is not present or is remarkably reduced, and loose bulk density is high and which is an easy-to-handle powder or the like. This has led to the completion of the present invention.

The present invention is as described below.

1. An aromatic polycarbonate oligomer solid including a repeating unit represented by the following general formula (1) and having a weight average molecular weight of 500 to 10000, a low molecular weight component of 5.0 area % or less as measured by high performance liquid chromatography, and a loose bulk density of 0.30 g/cm³ or more.

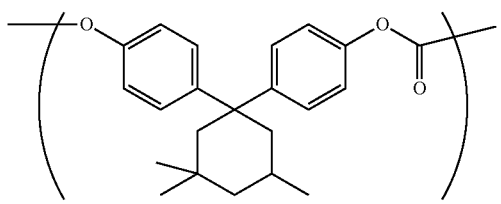

(1)

2. An aromatic polycarbonate oligomer solid including an aromatic dihydroxy compound represented by the following general formula (2) and a carbonic acid diester and having a weight average molecular weight of 500 to 10000, a low molecular weight component of 5.0 area % or less as measured by high performance liquid chromatography, and a loose bulk density of 0.30 g/cm³ or more.

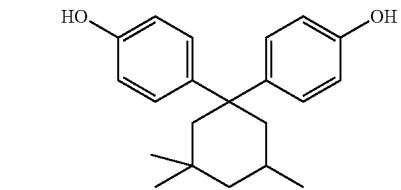

(2)

The weight average molecular weight, the low molecular weight component, and the loose bulk density in the present invention are values measured under the conditions described below.

Effects of the Invention

When the weight average molecular weight of the aromatic polycarbonate oligomer solid of the present invention is 500 to 10000, the viscosity is not increased, and the reactivity is improved. Further, the chlorine-containing compound is not present or is remarkably reduced, corrosion of equipment can be suppressed, and in addition, the low molecular weight component is 5.0 area % or less as measured by high performance liquid chromatography; therefore, deterioration of qualities such as coloration due to oxidation or the like is prevented, and storage stability is excellent.

Further, when polycarbonate is produced by the melt polymerization method or solid phase polymerization method using the polycarbonate oligomer solid of the present invention, since the amount of low molecular weight components is extremely small, volatile components in equipment are reduced, and it is expected that troubles such as line clogging can be prevented and that a purification process of removing the low molecular weight components from the resultant polycarbonate resin can be unnecessary or simplified.

Furthermore, since the solid has a loose bulk density of 0.30 g/cm³ or more, it is easy to handle, and in the use as a reaction raw material, the capacity of a reaction vessel can be smaller, and productivity is improved.

BEST MODE FOR CARRYING OUT THE INVENTION

Hereinafter, an aromatic polycarbonate oligomer solid of the present invention will be described in detail.

The aromatic polycarbonate oligomer solid of the present invention contains a repeating unit represented by the following general formula (1) and has a weight average molecular weight of 500 to 10000, a low molecular weight component of 5.0 area % or less as measured by high performance liquid chromatography, and a loose bulk density of 0.30 g/cm³ or more.

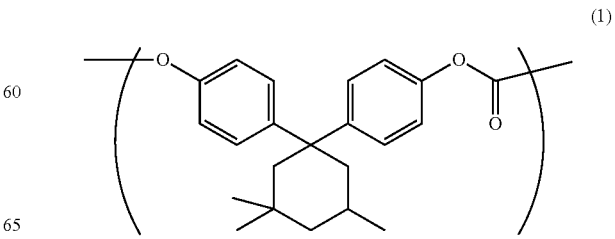

(1)

A method of producing an aromatic polycarbonate oligomer according to the present invention is not particularly limited, and any conventionally known method can be used. Specific examples thereof include an interfacial polymerization method, a melt transesterification method, a solid phase polymerization method, a cyclic carbonate compound ring-opening polymerization method, and a pyridine method. Among them, the interfacial polymerization method and the melt transesterification method using aromatic dihydroxy compounds and a carbonate precursor as raw materials are preferred.

In the production of an aromatic polycarbonate oligomer according to the present invention, an aromatic dihydroxy compound as a raw material corresponds to 1,1-bis(4-hydroxyphenyl)-3,3,5-trimethyl cyclohexane represented by the following general formula (2).

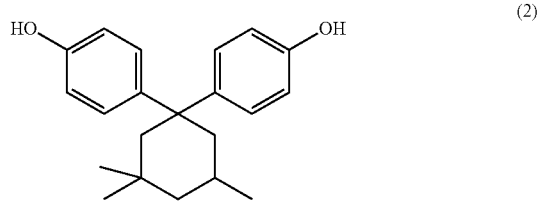

(2)

In the aromatic dihydroxy compound to be used as the raw material of the aromatic polycarbonate oligomer according to the present invention, as long as the effect of the present invention is not impaired, a dihydroxy compound such as bisphenol A, other than 1,1-bis(4-hydroxyphenyl)-3,3,5-trimethyl cyclohexane represented by the above general formula (2), may be used as a copolymerization material.

In the case of using a copolymerization raw material, in all the dihydroxy compounds, a proportion of a dihydroxy compound copolymerization raw material, other than the mainly used 1,1-bis(4-hydroxyphenyl)-3,3,5-trimethyl cyclohexane represented by the above general formula (2), is in the range of 0 to 30 mol %, preferably in the range of 0 to 20 mol %, more preferably in the range of 0 to 10 mol %, still more preferably in the range of 0 to 5 mol %, particularly preferably in the range of 0 to 2 mol %.

As a carbonate precursor to be reacted with the aromatic dihydroxy compound, carbonyl halide, carbonate ester, haloformate, and the like are used. Specific examples include phosgene; carbonic acid diesters such as diaryl carbonates such as diphenyl carbonate and ditolyl carbonate and dialkyl carbonates such as dimethyl carbonate and diethyl carbonate; and dihaloformates of dihydric phenols. These carbonate precursors may be used alone or in combination of two or more.

Further, these carbonate precursors are usually selected appropriately according to the production process. In obtaining the aromatic polycarbonate oligomer according to the present invention, phosgene is preferable in the interfacial polymerization method, carbonic acid diester is preferable in the melt transesterification method, and diphenyl carbonate is particularly preferable.

The aromatic polycarbonate oligomer according to the present invention has a weight average molecular weight of 500 to 10000, preferably 1000 to 9000, more preferably 1500 to 8500, still more preferably 2000 to 8000. When the aromatic polycarbonate oligomer has such a molecular weight, the viscosity is not increased, and the reactivity is also improved.

The low molecular weight component according to the present invention is a transesterification condensate mainly having a degree of polymerization of 2 or less, measured by high performance liquid chromatography analysis (by high performance liquid chromatography analysis area %), and, in addition, is a component containing low molecular compounds such as a raw material monomer residue, a phenol distillation residue which is a reaction product, and a solvent during reaction/purification. Specifically, the transesterification condensate is a compound having an absolute molecular weight of not more than an absolute molecular weight of a compound obtained by condensation of two molecules of an aromatic dihydroxy compound and three molecules of a carbonate precursor, and although the molecular weight varies depending on the aromatic dihydroxy compound and the carbonate precursor which are the raw materials of the above general formula (1), for example when an aromatic dihydroxy compound represented by the general formula (2) is 1,1-bis(4-hydroxyphenyl)-3,3,5-trimethyl cyclohexane, and the carbonate precursor is diphenyl carbonate and is a single homopolymerization, the transesterification condensate is a compound having an absolute molecular weight of 886 or less of a dimer in which both ends are phenyl groups.

If such a low molecular weight component is exemplified and assumed by a chemical formula, when the aromatic dihydroxy compound is represented by the general formula (2) and the carbonate precursor is diphenyl carbonate, examples thereof include a compound:

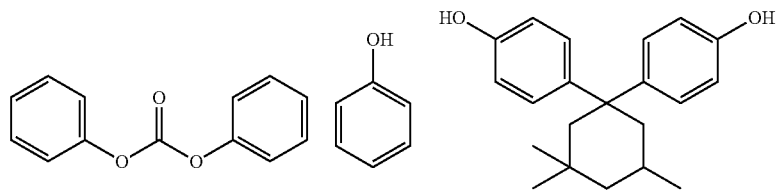

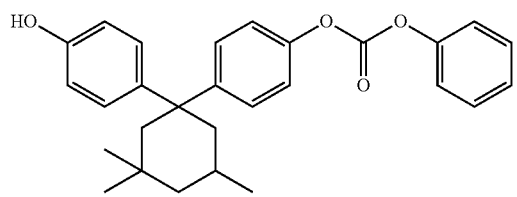

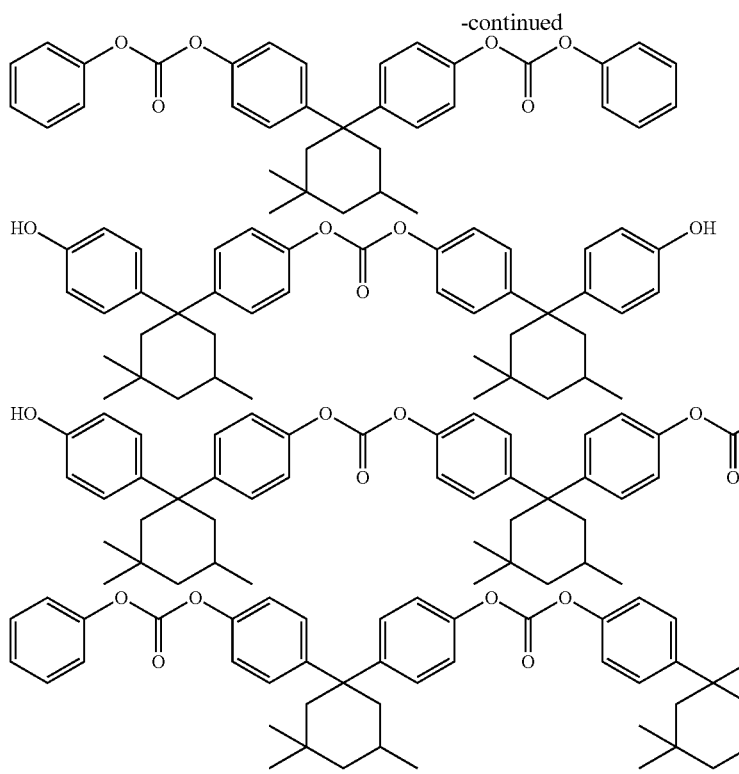
-continued

Measurement conditions of the low molecular weight component according to the present invention by high performance liquid chromatography analysis are conditions under which the low molecular weight component is separated from a compound having an absolute molecular weight of more than that. When the polycarbonate oligomer of the present invention is specified, the area % of the low molecular weight component is measured using a 254 nm absorbance photometric detector.

The content of the low molecular weight component contained in the aromatic polycarbonate oligomer according to the present invention is 5.0 area % or less, preferably 4.0 area % or less, more preferably 3.0 area % or less, still more preferably 2.0 area % or less, particularly preferably 1.0 area % or less as measured by high performance liquid chromatography under the above conditions.

In consideration of the yield, the content of the low molecular weight component contained in the aromatic polycarbonate oligomer according to the present invention is preferably 0.01 area % or more, more preferably 0.05 area % or more, still more preferably 0.1 area % or more as measured by high performance liquid chromatography under the above conditions.

The loose bulk density of the aromatic polycarbonate oligomer solid of the present invention is 0.30 g/cm$^3$ or more, preferably 0.31 g/cm$^3$ or more, more preferably 0.32 g/cm$^3$ or more, and preferably 0.90 g/cm$^3$ or less, more preferably 0.80 g/cm$^3$ or less, still more preferably 0.70 g/cm$^3$ or less, particularly preferably 0.65 g/cm$^3$ or less.

Among the methods for producing an aromatic polycarbonate oligomer according to the present invention, first, a method of obtaining the aromatic polycarbonate oligomer by the melt transesterification method will be described. In the melt transesterification method, a conventionally known method using an aromatic dihydroxy compound and a carbonic acid diester as raw materials can be used. For example, the reaction for obtaining an aromatic polycarbonate oligomer when the starting aromatic dihydroxy compound is 1,1-bis(4-hydroxyphenyl)-3,3,5-trimethyl cyclohexane and the starting carbonate diester is diphenyl carbonate is shown by the reaction formula.

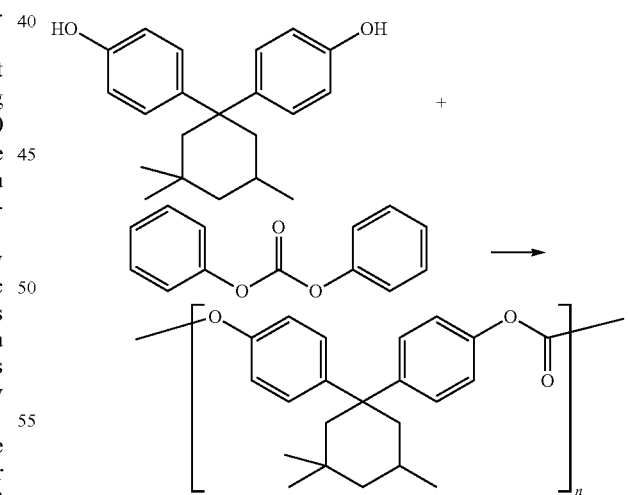

The melt transesterification reaction is carried out by stirring an aromatic dihydroxy compound and a carbonic acid diester in the presence of a catalyst while heating in an inert gas atmosphere at normal pressure or reduced pressure and distilling out phenol to be formed.

Specific examples of the carbonic acid diester to be reacted with the aromatic dihydroxy compound include diaryl carbonate such as diphenyl carbonate, ditolyl carbonate, or bis(m-cresyl)carbonate, dialkyl carbonate such as dimethyl carbonate, diethyl carbonate, or dicyclohexyl carbonate, alkylaryl carbonate such as methyl phenyl carbonate, ethyl phenyl carbonate, or cyclohexyl phenyl carbonate, and dialkenyl carbonate such as divinyl carbonate, diisopropenyl carbonate, or dipropenyl carbonate. Preferred is diaryl carbonate, and particularly preferred is diphenyl carbonate.

It is possible to usually obtain an aromatic polycarbonate oligomer in which a desired molecular weight and the amount of terminal hydroxyl groups are adjusted by adjusting a mixing ratio of the carbonic acid diester and the aromatic dihydroxy compound and the degree of pressure reduction during transesterification reaction.

In the mixing ratio of the carbonic acid diester and the aromatic dihydroxy compound for obtaining the aromatic polycarbonate oligomer according to the present invention, the carbonic acid diester is usually 0.5 to 1.5 times by mol, preferably 0.6 to 1.2 times by mol, relative to 1 mol of the aromatic dihydroxy compound.

In melt transesterification reaction, a transesterification catalyst is used, if necessary, in order to increase the reaction rate. The transesterification catalyst is not particularly limited, and it is possible to use a known transesterification catalyst such as alkali metal compounds such as inorganic alkali metal compounds such as hydroxides of lithium, sodium, and cesium, carbonates, and hydrogencarbonate compounds and organic alkali metal compounds such as alcoholates and organic carboxylic acid salts; alkaline earth metal compounds such as inorganic alkaline earth metal compounds such as hydroxides and carbonates of beryllium, magnesium, and the like and organic alkaline earth metal compounds such as alcoholates and organic carboxylic acid salts; basic boron compounds such as sodium salts, calcium salts, and magnesium salts of tetramethylboron, tetraethylboron, butyltriphenylboron, and the like; basic phosphorus compounds such as trivalent phosphorus compounds such as triethylphosphine and tri-n-propylphosphine and quaternary phosphonium salts derived from these compounds; basic ammonium compounds such as tetramethyl ammonium hydroxide, tetraethyl ammonium hydroxide, and tetrabutyl ammonium hydroxide; or amine compounds such as 4-aminopyridine, 2-dimethylaminoimidazole, and aminoquinoline. Among them, alkali metal compounds are preferable, and cesium compounds such as cesium carbonate and cesium hydroxide are particularly preferable.

As the amount of the catalyst to be used, the catalyst is used in a range in which a catalyst residue does not cause quality problems of the produced oligomer, and although it cannot be said unconditionally because the suitable amount to be added varies depending on the kind of the catalyst, roughly, the amount is usually 0.05 to 100 µmol, preferably 0.08 to 50 µmol, more preferably 0.1 to 20 µmol, still more preferably 0.1 to 5 µmol, relative to 1 mol of the aromatic dihydroxy compound, for example.

The catalyst may be added as it is or may be added by being dissolved in a solvent, and the solvent is preferably, for example, one which does not affect the reaction such as water, phenol, and the like.

As the reaction condition of the melt transesterification reaction, the temperature is usually in the range of 120 to 360° C., preferably in the range of 150 to 280° C., more preferably in the range of 180 to 260° C. If the reaction temperature is too low, the transesterification reaction does not proceed, and if the reaction temperature is high, side reactions such as decomposition reaction proceed; therefore, it is not preferable. The reaction is preferably carried out under reduced pressure. The reaction pressure is preferably a pressure at which carbonic acid diester as a raw material does not distill out of the system and the by-produced phenol distills, at the reaction temperature. Under such reaction conditions, the reaction is usually completed in about 0.5 to 10 hours.

Then, a separation process is carried out using a final reaction product obtained in the above reaction process.

The final reaction product containing the aromatic polycarbonate oligomer obtained by the above reaction process is usually a transparent viscous substance in a molten state around the reaction temperature and is a solid around ordinary temperature. By treating the final reaction product having such properties with a specific solvent and drying the reaction product, it is possible to obtain the solid of the present invention in which the low molecular weight components according to the present invention are remarkably reduced and the loose bulk density is high and which is an easy-to-handle powder or the like.

Although there are no particular restrictions on the method in the separation process of separating from the above-described final reaction product, for example, it is preferable that a solution is prepared by dissolving the entire final reaction product containing a low molecular weight component in a solvent (good solvent) which can dissolve the final reaction product well, then this solution is mixed with a solvent (poor solvent), which has a very low solubility for an aromatic polycarbonate oligomer but selectively dissolves the low molecular weight component, to dissolve and separate the low molecular weight component and to precipitate oligomer, or the final reaction product is directly mixed in a slurry state in a poor solvent to dissolve and separate the low molecular weight component in the poor solvent and to obtain the oligomer as a precipitate, and thus to separate by filtration and dry, whereby the aromatic polycarbonate oligomer solid of the present invention having a high loose bulk density is obtained. If necessary, the separation process may be repeated a plurality of times using the obtained aromatic polycarbonate oligomer.

The good solvent is a solvent which dissolves both the polycarbonate oligomer and the low molecular weight component well. Specific examples thereof include aromatic hydrocarbon solvents such as toluene and xylene and aliphatic ketone solvents having 1 to 8 carbon atoms such as acetone, methyl ethyl ketone, and methyl isobutyl ketone. A halogen-containing solvent such as dichloromethane and tetrahydrofuran are not suitable as good solvents, because chlorine component residue is mixed in the obtained solid and the loose bulk density of the obtained solid is low.

On the other hand, the poor solvent is a solvent which has a very low solubility for the polycarbonate oligomer but dissolves the low molecular weight component and in addition can obtain a solid in which the loose bulk density of the polycarbonate oligomer solid after separation and drying is high. Specific examples thereof include aliphatic alcohol solvents having 1 to 6 carbon atoms such as methanol, ethanol, and propanol and mixtures of the aliphatic alcohol solvents and water.

When the solvent used as a good solvent is a water-soluble ketone solvent such as acetone, water alone may be used as a poor solvent.

In the above separation process, a method in which the entire final reaction product is dissolved in a good solvent to prepare a solution, then this solution is mixed with a poor solvent to dissolve and separate the low molecular weight component, and the oligomer can be precipitated will be described in more detail. The entire final reaction product is heated, if necessary, and dissolved in a good solvent using, for example, a vessel equipped with a temperature raising device, a stirrer, and a condenser, and the solution is added dropwise to a poor solvent, or vice versa, the poor solvent is added dropwise to the solution to precipitate the aromatic polycarbonate oligomer and thus to separate the precipitate by filtration.

Here, although the amount ratio of the good solvent and the poor solvent to the final reaction product is not particularly limited, if the amount of the good solvent is too large, the yield is reduced, whereas if the amount of the poor solvent is too large, solvent recovery cost increases, which is not preferable.

Accordingly, with respect to the final reaction product, preferably, the good solvent is used in the range of 0.5 to 20 times by weight, and the poor solvent is used in the range of 0.5 to 50 times by weight. More preferably, the good solvent is used in the range of 0.6 to 15 times by weight, and the poor solvent is used in the range of 0.6 to 30 times by weight. Particularly preferably, the good solvent is used in the range of 0.7 to 12 times by weight, and the poor solvent is used in the range of 1.0 to 20 times by weight.

The weight of the poor solvent with respect to the weight of the good solvent is preferably in the range of 1.0 to 20 times by weight, more preferably 2.0 to 10 times by weight, particularly preferably 3.0 to 8.0 times by weight.

A method in which the final reaction product is directly mixed in a slurry state in a poor solvent to dissolve and separate the low molecular weight component in the poor solvent and to precipitate the oligomer will be described in more detail. When the entire final reaction product is a viscous substance in a molten state, the final reaction product is crushed as it is, or when the entire final reaction product is a solid, the final reaction product is crushed appropriately, if necessary. The final reaction product is heated if necessary, using, for example, a vessel equipped with a temperature raising device, a stirrer, and a condenser, added into the poor solvent under stirring, and made into a slurry state to dissolve and separate the low molecular weight component in the poor solvent, and the aromatic polycarbonate oligomer is precipitated to be separated by filtration. Here, although the amount ratio of the poor solvent to the final reaction product is not particularly limited, if the amount of the poor solvent is too large, the solvent recovery cost increases, which is not preferable.

Accordingly, the poor solvent is used preferably in the range of 1 to 50 times by weight, more preferably in the range of 1 to 30 times by weight, particularly preferably in the range of 2 to 20 times by weight with respect to the final reaction product.

The temperature and time for carrying out the separation by dissolution and precipitation operation in the above separation process are not particularly limited and may vary depending on the solvent used and the type of final reaction product, but are usually set within the range of 0 to 100° C. and 1 to 40 hours respectively.

The solution in which the low molecular weight component is dissolved is separated from a precipitate by using a filtration filter or the like, only the solution is removed, and the residue is dried using a dryer such as a vacuum dryer or a hot air dryer, so that the low molecular weight components in the present invention are reduced, and an aromatic polycarbonate oligomer having a high loose bulk density is obtained.

Next, a method of obtaining the aromatic polycarbonate oligomer according to the present invention by the interfacial polymerization method will be described. In the interfacial polymerization method, a conventionally known method of reacting an aromatic dihydroxy compound with a carbonate precursor such as phosgene under an inert solvent can be used.

In the polymerization reaction, for example, pH is usually maintained at 9 or more in the presence of an organic solvent inert to the reaction and an alkaline aqueous solution, and 1,1-bis(4-hydroxyphenyl)-3,3,5-trimethyl cyclohexane represented by the above general formula (2) and, if necessary, a molecular weight regulator (terminator) are used and reacted with phosgene. Then, a polymerization catalyst such as a tertiary amine or a quaternary ammonium salt is added, and interfacial polymerization is performed to obtain a polycarbonate oligomer.

The addition of the molecular weight regulator is not particularly limited as long as it is performed from the time of phosgenation to the start of the polymerization reaction. The reaction temperature is usually 0 to 40° C., and under such reaction conditions, the reaction is completed in about 10 minutes to 6 hours.

Specific examples of the organic solvent inert to the reaction include chlorinated hydrocarbons such as dichloromethane, 1,2-dichloroethane, chloroform, monochlorobenzene, and dichlorobenzene and aromatic hydrocarbons such as benzene and toluene. Examples of an alkali compound used for trapping hydrogen chloride generated by the reaction include alkali metal hydroxides such as sodium hydroxide and potassium hydroxide.

Examples of the molecular weight regulator include a compound having a monovalent phenolic hydroxyl group, and specific examples thereof include phenol, m-methylphenol, p-methylphenol, m-propylphenol, p-propylphenol, p-tert-butylphenol, and p-long-chain alkyl-substituted phenol. The amount of the molecular weight regulator to be used is preferably 50 to 0.5 mol, particularly preferably 30 to 1 mol, relative to 100 mol of the aromatic dihydroxy compound.

Examples of the polymerization catalyst include tertiary amines such as trimethylamine, triethylamine, tributylamine, tripropylamine, trihexylamine, and pyridine; and quaternary ammonium salts such as trimethylbenzylammonium chloride, tetramethylammonium chloride, and triethylbenzylammonium chloride.

In the interfacial polymerization method, the final reaction product containing the polycarbonate oligomer is usually obtained as solution of a chlorine type organic solvent such as dichloromethane or an aromatic hydrocarbon type organic solvent such as benzene. Accordingly, in order to obtain a polycarbonate oligomer solid, it is necessary to separate the polycarbonate oligomer from the solution and dry the polycarbonate oligomer, and as the separation method, "gel concentration method" (solvent distillation gelation, flash concentrated gelation, etc.), "hot water dropping method", "precipitation method", and the like are known. However, the polycarbonate oligomer obtained by separation and drying in this way in the prior art has a lot of impurities, such as chlorine component residue, low molecular weight component residue, and residue due to high temperature thermal history in a dryer, and is a solid in a powder state or the like having a low loose bulk density. Therefore, in the separation process in the present invention, the polycarbonate oligomer solid obtained from the final reaction product is dissolved in a specific solubilizing solvent (good solvent), and then this is subjected to precipitation treatment in a specific precipitating solvent (poor solvent), or the polycarbonate oligomer solid obtained from the final reaction product is subjected to slurry treatment in the poor solvent and dried. By performing such a separation process, it is possible to obtain the solid of the present invention in which the low molecular weight components are remarkably reduced, the chlorine-containing compound is not present or is remarkably reduced, and the loose bulk density is high and which is an easy-to-handle powder or the like.

Although a method in the separation process of obtaining the solid of the present invention from the polycarbonate oligomer solid obtained from the final reaction product is not particularly limited, the preferred method is the same as the method in the separation process of obtaining the solid of the present invention from the final reaction product in the melt transesterification method, and the preferred good solvent and poor solvent and the separation conditions and the like are the same thereas.

The use of the compound of the present invention obtained as described above will be described.

The polycarbonate oligomer of the present invention can be used as a raw material in producing a high molecular weight polycarbonate by various polymerization methods, and in particular, an aromatic polycarbonate obtained by the melt polymerization method or the solid phase polymerization method, using the compound of the present invention as a raw material has excellent transparency, heat resistance, mechanical properties, impact resistance, fluidity, and the like, and can be expected to be used in optical applications such as optical discs and lenses and various fields such as automobile field, electric/electronic field, and various containers as engineering plastics.

The compound of the present invention can be widely used as an additive such as a surface modifier, a flame retardant, an ultraviolet absorber, a fluidity modifier, a plasticizer, or a polymer modifier such as a resin alloy compatibilizer.

In addition, the compound of the present invention can also be used as various resin raw materials other than polycarbonate. In that case, the compound of the present invention can be used as it is or after processing.

EXAMPLES

Hereinafter, the present invention will be specifically described with reference to examples, but the present invention is not limited to these examples.

In the following examples, the weight average molecular weight was measured by gel permeation chromatography, the low molecular weight component was measured by area % of high performance liquid chromatography, and the loose bulk density was measured by the following method. The analysis method is as follows.

<Analysis Method>
1. Gel Permeation Chromatography Measurement
   Apparatus: HLC-8320 GPC manufactured by Tosoh Corporation
   Flow rate: 0.35 ml/min, Mobile phase: tetrahydrofuran, Amount of injection: 10 μl
   Column: TSKgel guard column Super MP(HZ)-N, TSKgel SuperMultipore HZ-N×3 columns
   Detector: RI
   Analysis method: Relative molecular weight in polystyrene equivalent. As polystyrene standards, A-500, A-2500, A-5000, F-1, F-2 and F-4 manufactured by Tosoh Corporation were used.
2. High Performance Liquid Chromatography Measurement
   Apparatus: manufactured by Shimadzu Corporation
   Pump: LC-10 ATvp
   Column oven: CTO-10 Avp
   Detector: SPD-10 Avp
   Column: Shim-pack CLC-ODS inner diameter 6 mm, length 150 mm
   Oven temperature: 50° C.
   Flow rate: 1.0 ml/min
   Mobile phase: (A) tetrahydrofuran, (B) 0.1 vol % aqueous phosphoric acid
   Gradient condition: (A) volume % (time from start of analysis)
   40% (0 min)→65% (10 min)→70% (20 min)→70% (40 min)→100% (50 min)→100% (60 min)
   Sample injection amount: 20 μl
   Detection wavelength: 254 nm
3. Loose Bulk Density Measurement
   Polycarbonate oligomer was placed in a measuring cylinder, and the volume ($cm^3$) and weight (g) of the contents were measured.

*Loose bulk density (g/$cm^3$)=weight (g)/volume ($cm^3$)

Example 1

121.7 g (0.4 mol) of 1,1-bis(4-hydroxyphenyl)-3,3,5-trimethyl cyclohexane and 58.6 g (0.3 mol) of diphenyl carbonate were charged into a four-necked flask equipped with a thermometer, a stirrer, a cooler, and after the inside of a reaction vessel was replaced with nitrogen, 0.3 g of a 0.08% cesium carbonate aqueous solution was added at 128° C. After the temperature was raised to 200° C., the reaction was carried out at a degree of pressure reduction of 1.3 kPa for 2 hours. Further, after the temperature was raised to 220° C., the reaction was carried out at a degree of pressure reduction of 0.3 kPa for 2 hour while distilling out the phenol formed. The low molecular weight component of 115.6 g of the final reaction solution obtained was 25.4% (high performance liquid chromatography area %).

Subsequently, a solution prepared by dissolving 72.5 g of the obtained final reaction solution in 145.0 g of acetone was added dropwise to 870.5 g of methanol charged in a four-necked flask over 2 hours while maintaining the temperature at 15° C., and precipitation operation was carried out. After stirring overnight, the precipitate was separated by filtration and dried to obtain 42.1 g of a crude product.

A solution prepared by dissolving 18.0 g of the obtained crude product in 54.0 g of acetone was added dropwise to 198.1 g of methanol charged in a four-necked flask over 30 minutes while maintaining the temperature at 15° C., and reprecipitation operation was carried out. After stirring overnight, the precipitate was separated by filtration and dried to obtain 14.8 g of powdered polycarbonate oligomer.

The weight average molecular weight of the obtained polycarbonate oligomer was 3930 (gel permeation chromatography), the low molecular weight component was 0.4% (high performance liquid chromatography area %), and the loose bulk density was 0.41 g/$cm^3$.

Comparative Example 1

A solution prepared by dissolving 27.0 g of the final reaction solution obtained in the same manner as in Example 1 in 127.1 g of tetrahydrofuran was added dropwise to 1863.0 g of methanol charged in a four necked flask over 2 hours while maintaining the temperature at 15° C., and precipitation operation was carried out. After stirring overnight, the precipitate was separated by filtration and dried to obtain 13.5 g of a crude product.

A solution prepared by dissolving 11.0 g of the obtained crude product in 103.4 g of dichloromethane was added dropwise to 1518.0 g of methanol charged in a four-necked flask over 2 hours while maintaining the temperature at 15° C., and reprecipitation operation was carried out. After stirring overnight, the precipitate was separated by filtration and dried to obtain 9.3 g of polycarbonate oligomer.

The weight average molecular weight of the obtained polycarbonate oligomer was 4143 (gel permeation chromatography), the low molecular weight component was 0.3%

(high performance liquid chromatography area %), and the loose bulk density was 0.26 g/cm$^3$.

The invention claimed is:

1. An aromatic polycarbonate oligomer solid comprising a repeating unit represented by the following general formula (1) and having a weight average molecular weight of 500 to 10000, a low molecular weight component of 5.0 area % or less as measured by high performance liquid chromatography, and a loose bulk density of 0.30 g/cm$^3$ or more

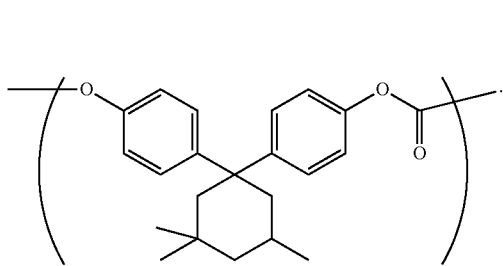

(1)

2. An aromatic polycarbonate oligomer solid comprising an aromatic dihydroxy compound represented by the following general formula (2) and a carbonic acid diester and having a weight average molecular weight of 500 to 10000, a low molecular weight component of 5.0 area % or less as measured by high performance liquid chromatography, and a loose bulk density of 0.30 g/cm$^3$ or more

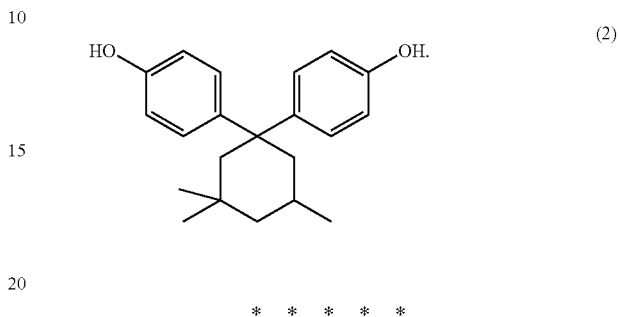

(2)

* * * * *